Figure 1:
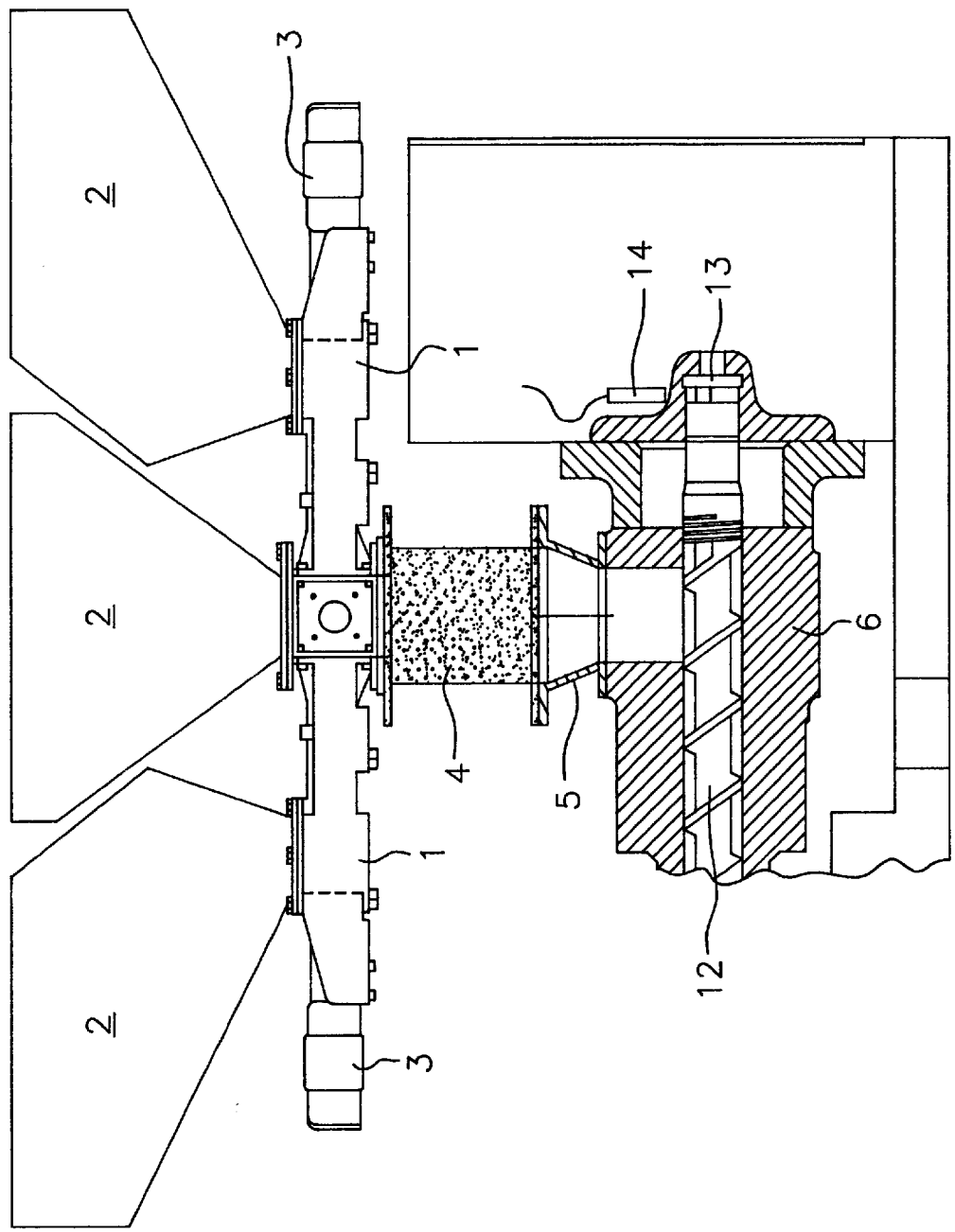

United States Patent

Saatkamp

[11] Patent Number: 6,118,374
[45] Date of Patent: Sep. 12, 2000

[54] PROCESS AND DEVICE FOR THE RECOGNITION OF SCREWS USED IN EXTRUDERS OR METERING DEVICES

[75] Inventor: Richard Saatkamp, Lengerich, Germany

[73] Assignee: Windmöller & Hölscher, Lengerich, Germany

[21] Appl. No.: 09/165,292

[22] Filed: Oct. 2, 1998

[30] Foreign Application Priority Data

Oct. 8, 1997 [DE] Germany .......................... 197 44 443

[51] Int. Cl.[7] ...................................................... G08B 1/08
[52] U.S. Cl. ................. 340/535; 340/572.1; 340/825.34; 340/825.23; 340/680; 340/632
[58] Field of Search ...................... 36/572.1, 531, 36/825.23, 825.34, 679, 680, 682, 534, 535, 825.54, 532; 239/61; 366/160.5, 298; 700/142, 175; 359/144, 113; 361/179, 600; 375/364

[56] References Cited

U.S. PATENT DOCUMENTS

| | | | |
|---|---|---|---|
| 4,742,470 | 5/1988 | Juengel | 700/175 |
| 4,843,640 | 6/1989 | Juengel | 359/144 |
| 5,092,522 | 3/1992 | Dykmans | 239/61 |
| 5,282,141 | 1/1994 | Fass et al. | 700/142 |
| 5,350,233 | 9/1994 | Sonntag et al. | 366/160.5 |
| 5,666,010 | 9/1997 | Stratiotis | 307/328 |
| 5,782,560 | 7/1998 | Hatanaka et al. | 366/298 |

*Primary Examiner*—Benjamin C. Lee
*Attorney, Agent, or Firm*—Jacobson, Price, Holman & Stern PLLC

[57] ABSTRACT

The invention concerns a process and a device for the recognition of screws used in extruders or metering devices. In order to create a process that excludes the possibility that mixtures of granulates or powders with incorrect mixing ratios occur through installation of inappropriate screw shafts in metering screws, the screws are coded and the code is electronically identifiable.

4 Claims, 2 Drawing Sheets

PROCESS AND DEVICE FOR THE RECOGNITION OF SCREWS USED IN EXTRUDERS OR METERING DEVICES

The invention concerns a process for the recognition of screws used in extruders or metering devices.

For example, for the production of profiles made out of plastic or for the production of blown films, mixtures of plastic granulates must frequently be fed to an extruder in a certain predetermined ratio. In order to produce these mixtures, granulates with predetermined quantity flows are drawn from different storage bins by metering screws and are introduced into a common shaft or an intake guide with mixture of the components.

In order to be able to draw off the individual components from the individual storage bins with various quantity flows corresponding to the desired mixing ratio, the metering screws are typically provided with easily interchangeable metering screw shafts that have varying transport capacities. The individual dosing screws, however, do not then permit viewing from outside to see with which screw shaft they are provided and with which transport capacity they are therefore working. If the screw shafts are mixed up or if there is an erroneous specification of screw shaft present in a metering screw, the mixture cannot be produced with the determined mixing ratio. If this erroneous mixture is then introduced into an extruder, waste is produced.

It is therefore the object of the invention to create a process and a device that excludes the possibility of mixtures of granulates and/or powders with erroneous mixing ratios from occurring through installation of inappropriate screw shafts in metering screws.

This problem is resolved according to the invention in that the screws have been coded and the code is electronically identifiable.

It is assured by the coding of the screws according to the invention that the extruders or dosing devices for each operating situation, or for each order to be executed, are provided with the correct screws, because the codings of the screws are detected by electronic reading devices, and the corresponding data are fed into a computer, which activates the operating process corresponding to the recognized screws, or interrupts the operation if an order cannot be executed with the installed screw.

The invention furthermore concerns a process for the mixture of several granulate and/or powder-form components with a predetermined mixing ratio with a metering screw assigned to each component with interchangeable screw shafts, which draw the components out of a storage bin and which can be driven by a motor, and with a computer in which the problem is resolved in that, the components stored in the partitioned storage bins are input into the computer, and the transport capacity of the data pertaining to the metering screws are fed to the computer by sensors that detect markings of screw shafts, and that the computer interrupts the metering operation, and/or emits an alarm signal, if the transport capacity of at least ore metering screw does not correspond to the predetermined mixing ratio.

In the process according to the invention, the computer controlling the mixing operation immediately recognizes the installation of an incorrect screw shaft in a metering screw, so that the metering operation can be immediately interrupted or an alarm signal issued. Since the computer receives messages through the sensors assigned to the individual screw shafts on their capacity, the screw shaft with incorrect capacity data can also be indicated immediately on a monitor.

The transport capacity of the metering screw does not just depend then upon the data of the screw shaft, thus the pitch and height of the screw spiral, but also on the drive rotational speed of the screw shaft. In an additional process of the type specified in the introduction, in which the motors driving the screw shafts are controllable, the posed problem can be resolved in that the components stored in the partitioned storage bins are input into the computer, and the transport capacity of the data pertaining to the metering screws are fed to the computer by sensors that detect markings of screw shafts, and that the computer regulates the setting of the predetermined mixing ratio through the controllable motor by adjusting the rotational speed of the metering screws to the required speed. Thus through the sensors detecting the markings of the screw shafts, the computer detects their geometric data and it sets the rotational speed of the screw shafts so that, on the basis of the quantities transported by the individual metering screws, the appropriate mixing ratio is attained.

It can then occur that, based on the geometric data of a screw shaft installed in the metering screw, the required capacity cannot be attained by changing the drive rotational speed. In such a case, it is provided that the computer interrupts the metering operation and/or emits an alarm signal, if the predetermined mixing ratio cannot be regulated.

A device for the execution of the process according to the invention thereby distinguishes itself in that the screw shafts are provided with markings distinguishing their capacities and that sensors that detect these markings are provided.

The markings can consist of a code that is applied to the perimeter of a collar of the screw shaft or to a disk rotating with it.

An embodiment of the invention is explained in greater detail with reference to drawings.

Figure 2:
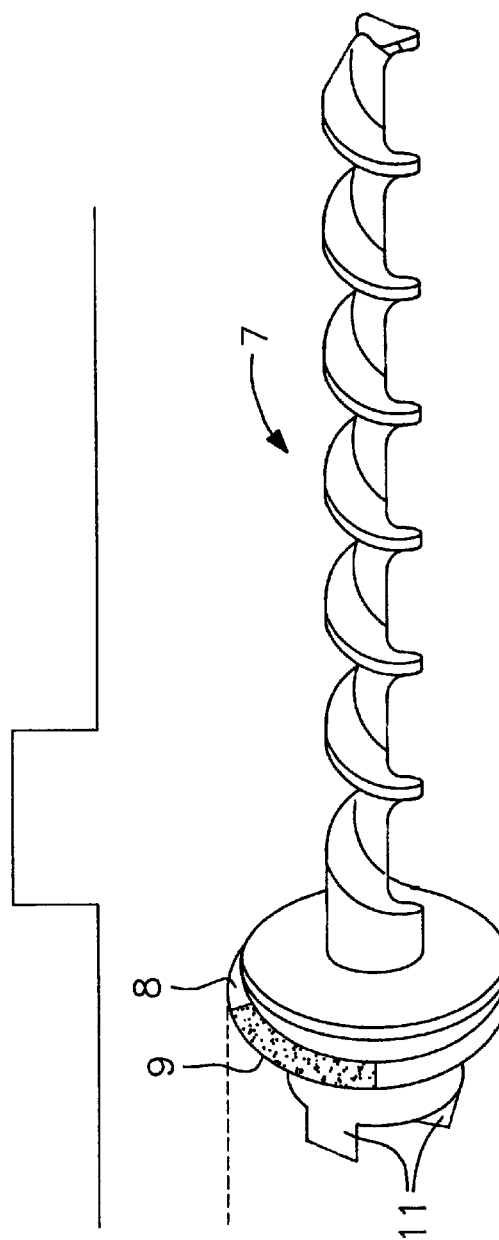
Figure 3:
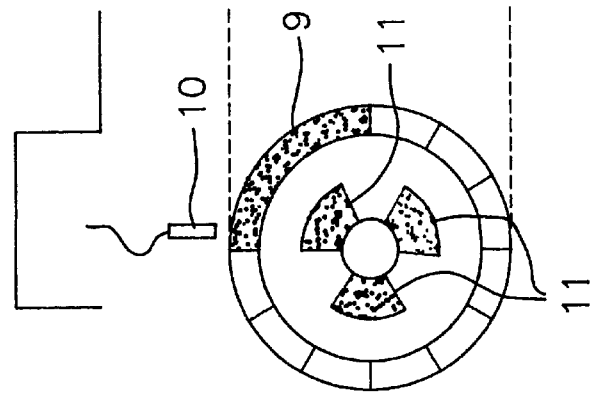

These show:

FIG. 1 a side view of a metering device from which the granulate mixture is conducted through a shaft and an intake guide to an extruder, illustrated in cross-section, FIG. 2 a perspective view of a screw shaft of a metering screw and FIG. 3 a rear view of the screw shaft as per FIG. 2.

The metering device visible in FIG. 1 consists of four metering screws 1 situated horizontally and in the form of a cross in relation to one another, atop the inputs of which funnel-type storage bins 2 are set. The screw shafts of the individual metering screws are driven by electric motors 3. The outlet of the metering screws 1 feed into a common shaft 4 that can be provided with the mixing plates. The shaft 4 is situated atop the intake mouthpiece 5 of an extruder 6.

The screw shafts 7 of the metering screws 1 are provided on the appropriate place with markings. In the embodiment according to FIGS. 2 and 3, the screw shaft 7 has disk-like expansions 8 at its end supplying the drive, that are provided on their outer perimeter over a predetermined angle range with a marking 9 detectable by a sensor. The sensor 10, which can be built into the housing, detects the marking 9 and determines from the ratio of the length of the marking to the length of the marking-free perimeter of the disk 8 the characteristic data of the screw shaft 7, which is then fed to a computer (not shown).

The screw shaft 7 is provided at its end supplying the drive with a claw coupling 11, which is engaged with a coupling mating piece driven by a motor for the drive of the screw shaft.

In FIG. 1, the screw shaft 12 of the extruder 6 is provided at its end supplying the drive with markings 13, which are detected by a sensor 14. This marking and the sensor 14, however, are not used for the detection, or adjustment, of the mixing ratio.

What is claimed is:

1. A process for mixing of several granulate and/or powder-form components in a predetermined mixing ratio with a metering screw assigned to each component with interchangeable screw shafts, which draw the components out of storage bins and which can be driven by a motor, and with the use of a computer, said process comprising:

inputting into the computer a signal representative of each of the components stored in the storage bins, and feeding into the computer data pertaining to transport capacity of the metering screws as determined by sensors that detect markings on the screw shafts, and initiating by the computer one of the interruption of the metering operation and emission of an alarm signal, if the transport capacity of at least one metering screw does not correspond to the predetermined mixing ratio.

2. The process according to claim 1, further comprising controllable motors driving the screw shafts, wherein, the computer regulates the setting of the predetermined mixing ratio through the controllable motor by adjusting the rotational speed of the metering screws to the required speed.

3. The process according to claim 2, whereint he computer initiates one of interruption of the metering operation and emission of the alarm signal, if the predetermined mixing ratio cannot be obtained by the sensed metering screw.

4. The process according to claim 2, wherein the markings on the screw shafts consist of a code that is applied to one of a perimeter of a collar of the screw shaft and to a disk rotating with the screw shaft.

* * * * *